United States Patent
Marley

(10) Patent No.: US 8,439,305 B2
(45) Date of Patent: May 14, 2013

(54) NON-HANDED THRUST REVERSER FOR INSTALLATION ON HANDED AIRCRAFT GAS TURBINE PROPULSION ENGINES

(75) Inventor: Scott Marley, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1150 days.

(21) Appl. No.: 12/481,213

(22) Filed: Jun. 9, 2009

(65) Prior Publication Data

US 2010/0307130 A1    Dec. 9, 2010

(51) Int. Cl.
*F02K 1/54* (2006.01)
*B64D 27/00* (2006.01)

(52) U.S. Cl.
USPC .... 244/110 B; 244/55; 60/226.2; 239/265.25; 239/265.27

(58) Field of Classification Search ......... 244/12.5, 244/23 D, 53 R, 110 B, 55; 60/226.2, 230; 239/265.19, 265.25, 265.27, 265.31
See application file for complete search history.

(56) References Cited

U.S. PATENT DOCUMENTS

| | | | |
|---|---|---|---|
| 2,780,424 A | 2/1957 | Price | |
| 3,806,067 A * | 4/1974 | Kutney | 244/53 R |
| 4,068,470 A | 1/1978 | Sargisson et al. | |
| 4,175,385 A | 11/1979 | Nash | |
| 4,185,798 A * | 1/1980 | Dickenson | 244/110 B |
| 4,449,683 A | 5/1984 | Gratzer et al. | |
| 5,103,634 A | 4/1992 | Harrison et al. | |
| 5,592,813 A * | 1/1997 | Webb | 60/226.2 |
| 5,806,302 A | 9/1998 | Cariola et al. | |
| 6,415,599 B1 | 7/2002 | Ausdenmoore et al. | |
| 6,857,600 B1 | 2/2005 | Walker et al. | |
| 7,165,744 B2 | 1/2007 | Howarth et al. | |
| 8,015,797 B2 * | 9/2011 | Lair | 60/226.2 |

* cited by examiner

*Primary Examiner* — Joseph W Sanderson
(74) *Attorney, Agent, or Firm* — Ingrassia Fisher & Lorenz, P.C.

(57) ABSTRACT

An assembly for an aircraft gas turbine propulsion engine includes an engine nacelle and a thrust reverser. The engine nacelle is configured to have at least a portion of an aircraft gas turbine propulsion engine mounted therein, and includes an intake end, an exhaust end, and an outer surface that extends between the intake end and the exhaust end. At least the engine nacelle outer surface proximate the exhaust end has a semicircular section and a noncircular section. The thrust reverser includes a forward end, an aft end, and an outer surface that extends between the forward and aft ends. The thrust reverser forward end is coupled to the engine nacelle exhaust end. At least the thrust reverser outer surface proximate the forward end has an arc section and a noncircular section. The arc section subtends an angle greater than π radians.

17 Claims, 5 Drawing Sheets

NON-HANDED THRUST REVERSER FOR INSTALLATION ON HANDED AIRCRAFT GAS TURBINE PROPULSION ENGINES

TECHNICAL FIELD

The present invention generally relates to aircraft gas turbine propulsion engines, and more particularly relates to non-handed thrust reversers that may be installed on handed aircraft gas turbine propulsion engines.

BACKGROUND

Aircraft main engines not only provide propulsion for the aircraft, but in many instances may also be used to drive various other rotating components such as, for example, generators, compressors, and pumps, to thereby supply electrical, pneumatic, and/or hydraulic power. A typical aircraft main engine is implemented using a gas turbine engine, such as a turbofan engine, that is mounted within an engine nacelle. Because, as was just noted, the main engine may also be used to drive various other rotating components, gearing mechanisms (e.g., auxiliary gear boxes, integrated drive gears, etc.) may also be disposed within the engine nacelle. As a result, portions the engine nacelle may be noncircular in cross section.

The main propulsion engines on most jet aircraft also include thrust reversers. As is generally known, thrust reversers enhance the stopping power of the aircraft. More specifically, the thrust reversers, when deployed, redirect the rearward thrust of the engine to a forward direction to decelerate the aircraft. Because the thrust is directed forward, the thrust also slows down the aircraft upon landing. Various thrust reverser designs are commonly known, and the particular design utilized depends, at least in part, on the engine manufacturer, the engine configuration, and the propulsion technology being used. Some of these thrust reverser designs, such as target-type reversers and pivot door reversers, are coupled to the engine nacelle.

The noncircular cross section of a portion of the engine nacelle mentioned above, in combination with various other aerodynamic aircraft design objectives, results in many aircraft propulsion engines being configured as what are referred to as "handed aircraft propulsion engines." What this means is that an aircraft propulsion engine is configured to be mounted on a particular side of an aircraft. That is, either the right-hand side or the left-hand side of the aircraft. In addition, the noncircular cross section may, in many instances, include the nacelle-to-thrust reverser interface. A noncircular nacelle-to-thrust reverser interface on a handed aircraft propulsion engine results in the need for handed thrust reversers. In other words, the same thrust reverser design cannot be used on both the right-hand engine and the left-hand engine. This can result in significant additional costs associated with original design efforts, manufacturing tooling, and aftermarket inventory of spare parts.

Hence, there is a need for a non-handed thrust reverser that can be installed on handed aircraft propulsion engines having a noncircular nacelle-to-thrust reverser interface, to thereby reduce or eliminate the additional costs associated with handed thrust reversers. The present invention addresses at least this need.

BRIEF SUMMARY

In one exemplary embodiment, an assembly for an aircraft gas turbine propulsion engine includes an engine nacelle and a thrust reverser. The engine nacelle is configured to have at least a portion of an aircraft gas turbine propulsion engine mounted therein, and comprises an intake end, an exhaust end, and an outer surface that extends between the intake end and the exhaust end. At least the engine nacelle outer surface proximate the exhaust end has a semicircular section and a noncircular section. The thrust reverser includes a forward end, an aft end, and an outer surface that extends between the forward and aft ends. The thrust reverser forward end is coupled to the engine nacelle exhaust end. At least the thrust reverser outer surface proximate the forward end has an arc section and a noncircular section. The arc section subtends an angle greater than $\pi$ radians.

In another exemplary embodiment, an assembly for an aircraft gas turbine propulsion engine includes an engine nacelle and a thrust reverser. The engine nacelle is configured to have at least a portion of an aircraft gas turbine propulsion engine mounted therein, and comprises an intake end, an exhaust end, and an outer surface that extends between the intake end and the exhaust end. At least the engine nacelle outer surface proximate the exhaust end has a semicircular section and a noncircular section. The thrust reverser includes a forward end, an aft end, and an outer surface that extends between the forward and aft ends. The thrust reverser forward end is coupled to the engine nacelle exhaust end. At least the thrust reverser outer surface proximate the forward end has an arc section and a noncircular section. The arc section subtends an angle that is a predetermined number of radians greater than $\pi$ radians. The engine nacelle and thrust reverser circumscribe an axis of symmetry that extends between the engine nacelle intake end and the thrust reverser aft end. At least a portion of the engine nacelle outer surface noncircular section has a contour that is rotated about the axis of symmetry in a first rotational direction if the engine nacelle is configured for mounting on a first side of an aircraft, and in a second rotational direction if the engine nacelle is configured for mounting on a second side of an aircraft.

In yet another exemplary embodiment, an aircraft includes a fuselage, a left-hand engine nacelle, a right-hand engine nacelle, a first thrust reverser, and a second thrust reverser. The fuselage has a left pylon and a right pylon extending therefrom. The left-hand engine nacelle is coupled to the left pylon, and is not configured for coupling to the right pylon. The right-hand engine nacelle coupled to the right pylon, and is not configured for coupling to the left pylon. The first thrust reverser is coupled to the left-hand engine, and the second thrust reverser is coupled to the right-hand engine. The first thrust reverser and the second thrust reverser are identical, whereby the first thrust reverser may be coupled to the right-hand engine and the second thrust reverser may be coupled to the left-hand engine.

Furthermore, other desirable features and characteristics of the present invention will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although an embodiment of the invention is described herein as being implemented on a dual-engine aircraft, it will be appreciated that it could also be implemented on a tri-engine (or greater) aircraft.

Figure 1:
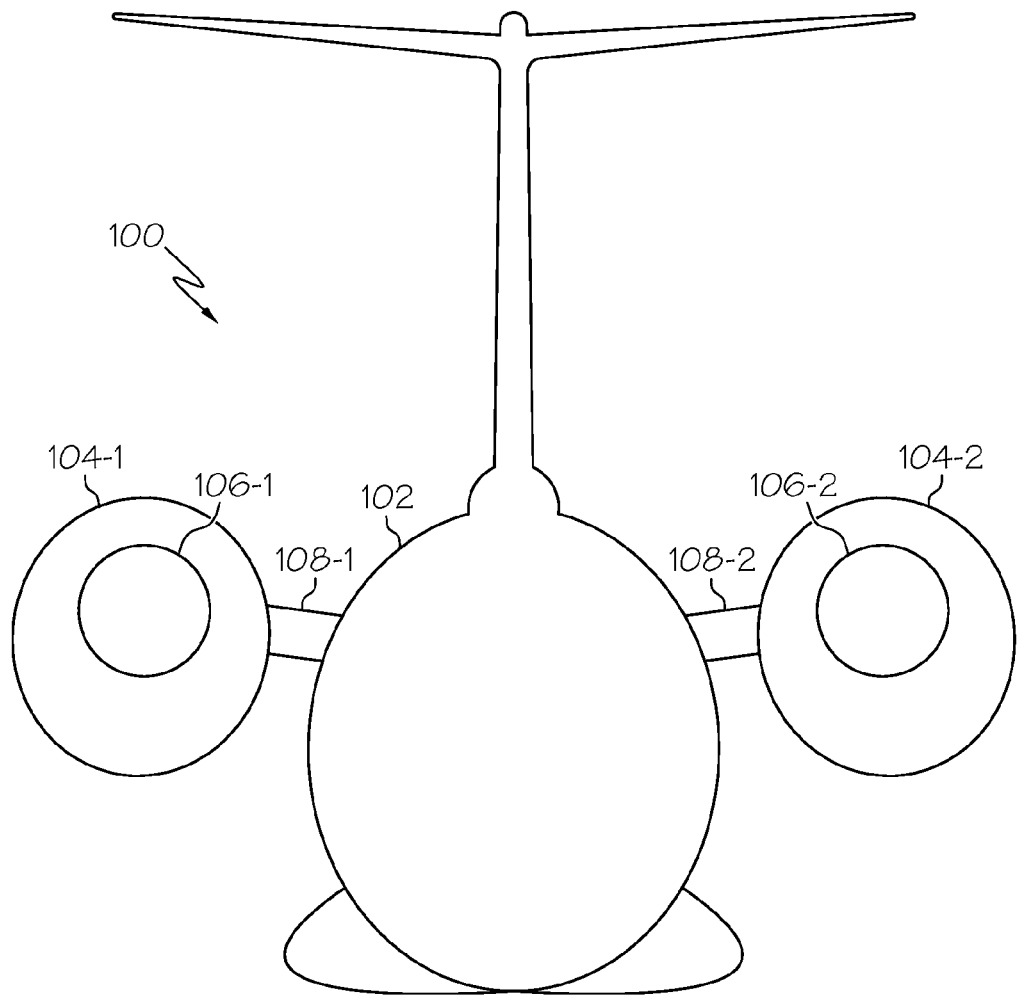
FIG. 1 depicts a simplified end view of an exemplary aircraft from the perspective of a viewer looking forward from the aircraft aft end.

Referring to FIG. 1, a simplified end view of an exemplary aircraft 100, from the perspective of a viewer looking forward from the aircraft aft end, is depicted. The aircraft 100 may be any one of numerous dual-engine jet aircraft and includes, among other things, a fuselage 102, a plurality of engine nacelles 104 (104-1, 104-2), and a plurality of thrust reversers 106 (106-1, 106-2). A pair of pylons extends from the fuselage 102. From the perspective depicted in FIG. 1 (i.e., looking forward from the aircraft aft end), this pair of pylons is referred to herein as a left pylon 108-1 and a right pylon 108-2. It will be appreciated that the particular viewer perspective is not limiting. Rather, if the convention used were from the perspective of a viewer looking aft from the aircraft forward end, then the pylon labeled with reference numeral 108-1 in FIG. 1 would be the right pylon, and the pylon labeled with reference numeral 108-2 in FIG. 1 would be the left pylon.

No matter the particular convention that is used for the pylons 108, it may be appreciated that the engine nacelles 104 may be referred to herein, using a consistent convention (again, whichever that may be), as a left-hand engine nacelle 104-1 and a right-hand engine nacelle 104-2. As is readily apparent, the left-hand engine nacelle 104-1 is coupled to the left pylon 108-1, and the right-hand engine nacelle 104-2 is coupled to the right pylon 108-2. The engine nacelles 104 are handed engine nacelles, which means that the left-hand engine nacelle 104-1 is not configured for coupling to the right pylon 108-2 and the right-hand engine nacelle 104-2 is not configured for coupling to the left pylon 108-1.

The thrust reversers 106, which are referred to herein as a first thrust reverser 106-1 and a second thrust reverser 106-2, are coupled, one each, to the engine nacelles. In particular, the first engine nacelle 106-1 is coupled to the left-hand engine nacelle 104-1, and the second thrust reverser 106-2 is coupled to the right-hand engine nacelle 104-2. The thrust reversers 106, unlike the engine nacelles 104, are not handed. Rather, the first and second thrust reversers 106-1, 106-2 are identical, and may be coupled to either engine nacelle 104. That is, the first thrust reverser 106-1 may be coupled to the right-hand engine nacelle 106-2, and the second thrust reverser 106-2 may be coupled to the left-hand engine nacelle 104-1.

Figure 2:
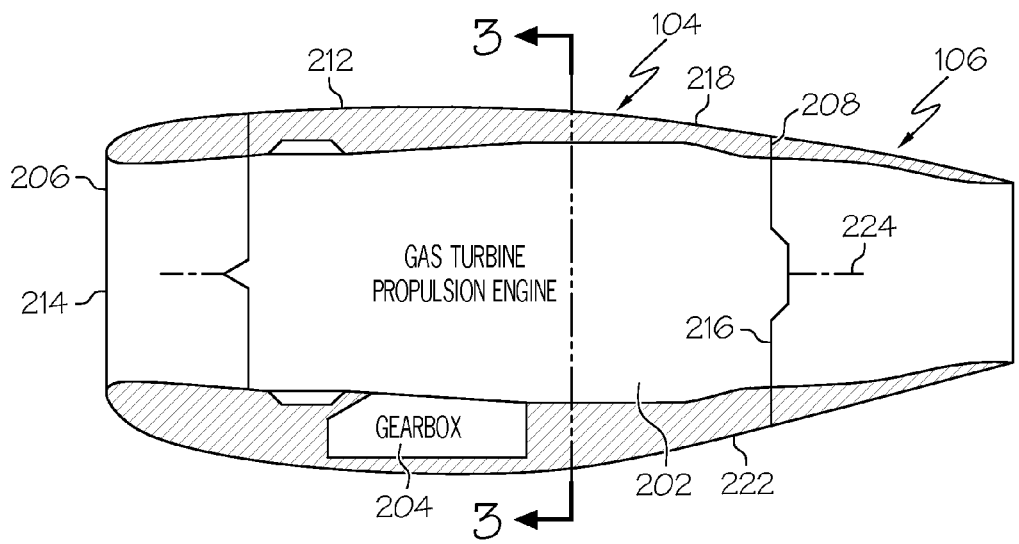
FIG. 2 depicts a side cross section view of an engine nacelle and thrust reverser with a gas turbine propulsion engine and gear box mounted therein.
Figure 3:
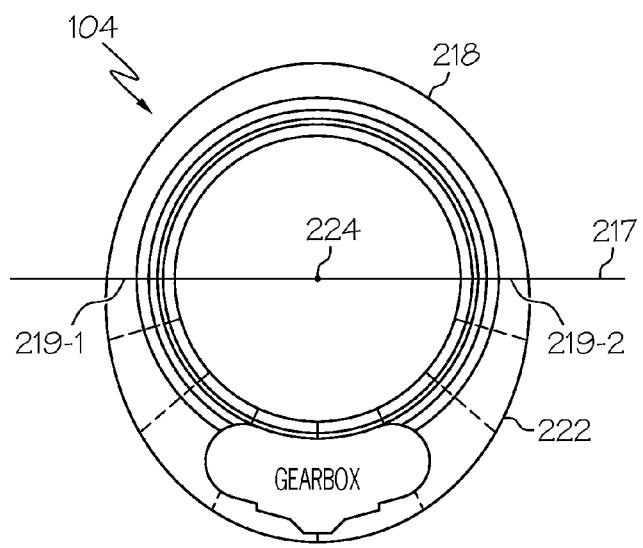
FIG. 3 depicts another cross section view of the engine nacelle of FIG. 2, taken along line 3-3, and with the gas turbine propulsion engine removed.

As FIG. 1 further depicts, at least a portion of each of the engine nacelles 104 do not have a circular cross sectional shape. The reason for this, as shown more clearly in FIGS. 2 and 3, is because the each engine nacelle 104 is configured to house not only a gas turbine propulsion engine 202, but also a gear box 204. The gas turbine propulsion engine 202 may be implemented as any one of numerous types of gas turbine propulsion engine, but in the depicted embodiment it is implemented as turbofan gas turbine propulsion engine. Moreover, the specific type of turbofan gas turbine propulsion engine may vary. No matter the specific type of gas turbine propulsion engine 202, the gear box 204 is coupled to, and receives a drive torque from, the gas turbine propulsion engine 202 in a manner that is well known in the art. The gear box 204, in a manner that is also well known in the art, transfers the drive torque it receives from the gas turbine propulsion engine to one or more non-illustrated accessories.

Before proceeding further, it should be noted that a description of the operation and configuration of the gas turbine propulsion engine 202 and gear box 204 are not needed to fully describe or enable the instant invention. Thus, each of these components is depicted using functional blocks, and specific descriptions of each will not be further provided. However, returning once again to FIGS. 2 and 3, the engine nacelles 104 and thrust reversers 106 will be further described.

Each engine nacelle 104 includes an intake end 206, an exhaust end 208, and an outer surface 212 that extends between the intake and exhaust ends 206, 208. The intake end 206 defines an intake port 214 into which air is drawn during gas turbine propulsion engine 202 operation, and the exhaust end 208 defines an exhaust port 216 through which turbine exhaust gas and bypass air are discharged. As shown most clearly in FIG. 3, the outer surface 212, at least proximate the exhaust end 208, is defined by a semicircular section 218 and a noncircular section 222. As used herein, the term "noncircular" means that, while this section 222 may be curved, it is not arc-shaped. Although the specific shape of the noncircular section 222 may vary, in a particular preferred embodiment it is ellipsoidal or at least substantially ellipsoidal in shape. The differentiation of semicircular and noncircular sections 218, 222 is illustrated in FIG. 3 by a horizontal plane 217 that extends into and out of the page, and that defines two ends 219 (219-1, 219-2) of the semicircular section 218.

The distance that the noncircular section 222 extends from the exhaust end 208 toward the intake end 206 may vary depending, for example, on the relative position of the gear box 204 within the engine nacelle 104. Indeed, it is primarily because of the gear box 204 that the engine nacelle outer surface 212 is asymmetrically shaped. More specifically, the semicircular section 218 is configured to clear the gas turbine propulsion engine 202, whereas the noncircular section 222 is configured to clear the gear box 204 (or other equipment).

As a result of the asymmetry described above, and as shown more clearly in FIG. 4, the semicircular section 218 extends from the engine nacelle exhaust end 208 a predetermined distance toward the engine nacelle intake end 206 at a first angle ($\alpha_1$), which is referred to herein as the upper loft angle, relative to a rotational axis of symmetry 224 that extends through the engine nacelle 104 and thrust reverser 106 and lies within the horizontal plane 217. Moreover, the noncircular section 222 extends from the engine nacelle exhaust end 208 a predetermined distance toward the engine nacelle intake end 206 at a second angle ($\alpha_2$), which is referred to herein as the lower loft angle, relative to the rotational axis of symmetry 224. It will be appreciated that the specific upper and lower loft angles may vary; however, the lower loft angle is greater than the upper loft angle. As an example, in one particular implementation the lower loft angle is about 15-degrees and the upper loft angle is about 12-degrees.

Figure 4:
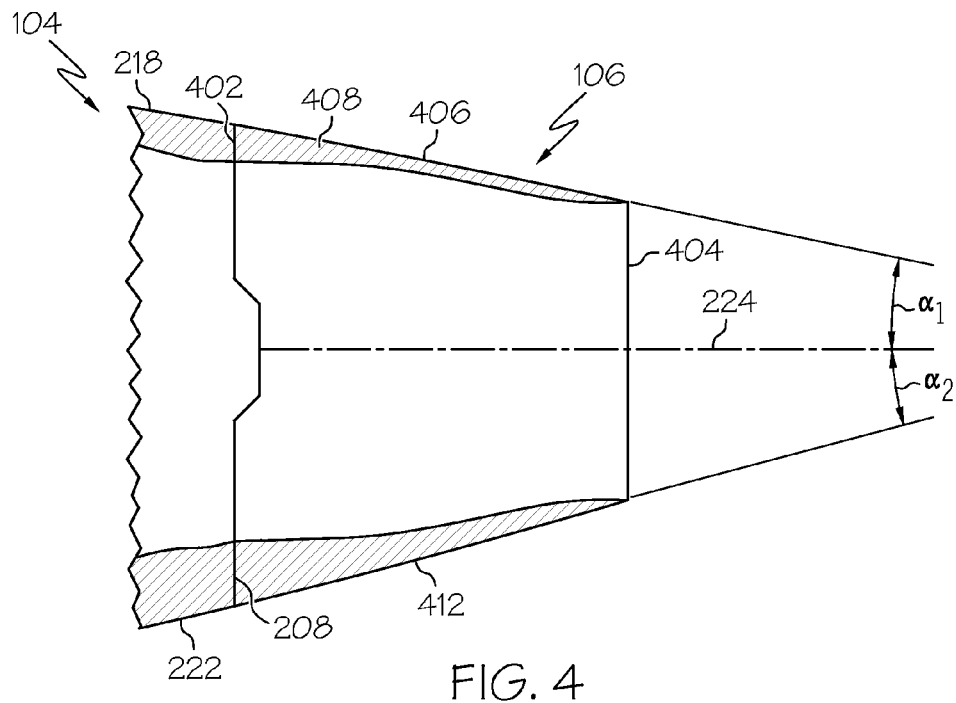
FIG. 4 is a close view of the thrust reverser depicted in FIG. 2.

With continued reference to FIG. 4, it is seen that each thrust reverser 106 includes a forward end 402, an aft end 404, and an outer surface 406 that extends between the forward and aft ends 402, 404. The thrust reverser 106 forward end 402 is coupled to the exhaust end 208 of an engine nacelle 104. To maintain a relatively smooth, aerodynamic surface, it is seen that each thrust reverser 106 extends between its forward and aft ends 402, 404 at the upper ($\alpha_1$) and lower ($\alpha_1$) loft angles. It may thus be appreciated that each thrust reverser outer surface 406, or at least a portion of each thrust reverser outer surface 406, is asymmetrically shaped. Indeed, as is shown most clearly in FIG. 5, the thrust reverser outer surface 406, preferably along its entire length but at least proximate the forward end 402, is defined by an arc section 408 and a noncircular section 412.

Figure 5:
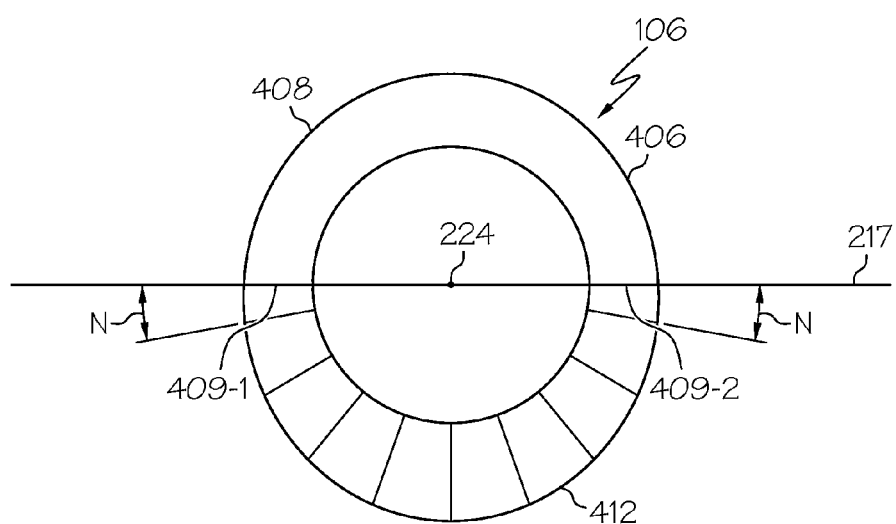
FIG. 5 is an end view, from the perspective of a viewer looking forward from the aft end, of the thrust reverser of FIGS. 2 and 4.

The thrust reverser arc section 408 is referred to herein using that terminology because, as FIG. 5 also depicts, this section 408 is not semicircular. Rather, the thrust reverser arc section 408 subtends, between two ends 409 (409-1, 409-2), an angle that is a predetermined number of radians (e.g., N-number of radians) greater than $\pi$ radians. Stated another way, the arc section 408 extends a predetermined number of degrees (N) below the horizontal plane 217. It will be appreciated that the predetermined number of degrees that the arc section 408 extends below the horizontal plane 217 may vary, and will depend upon the amount, as will be now described, that each thrust reverser 106 is clocked (or rotated) when it is coupled to its associated engine nacelle 104. As an example, in one particular embodiment, the predetermined number of degrees (N) is 10-degrees.

Figure 6:
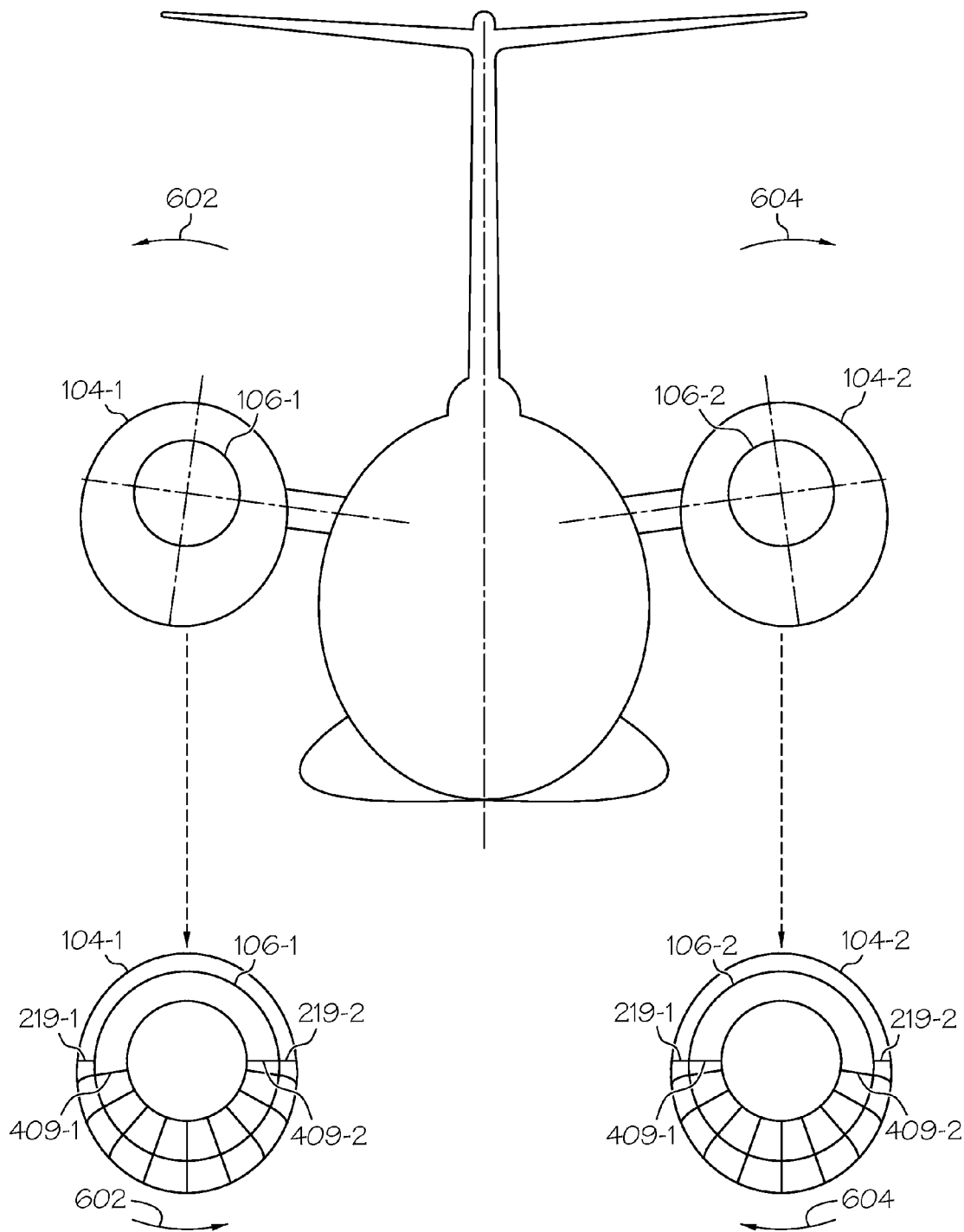
FIG. 6 depicts the exemplary aircraft of FIG. 1, along with a more detailed representation of the manner in which the engine nacelles and thrust reversers are relatively positioned.

It was just mentioned that each thrust reverser 106, when it is coupled to an engine nacelle 104, is rotated the predetermined number of degrees (N). The direction in which the thrust reverser 106 is rotated will depend upon whether it is coupled to a left-hand engine nacelle 104-1 or a right-hand engine nacelle 104-2. For example, as is shown more clearly in FIG. 6, if the thrust reverser 106 is coupled to a left-hand engine nacelle 104-1, then the thrust reverser 106 is rotated the predetermined number of degrees (N) in a counterclockwise direction 602 (from the perspective of a viewer looking forward from the aircraft aft end), and if the thrust reverser 106 is coupled to a right-hand engine nacelle 104-2, then the thrust reverser 106 is rotated the predetermined number of degrees (N) in a clockwise direction 604. In doing so it is seen that one of the ends 409-1, 409-2 of the thrust reverser arc section 408 is coplanar with one of the ends 219-1, 219-2 of the engine nacelle semicircular section 218.

Figure 7:
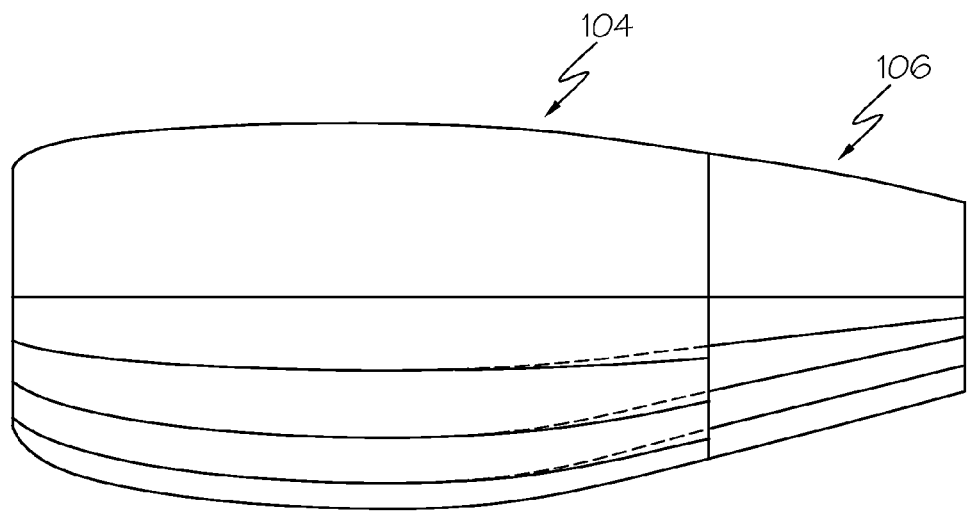
FIGS. 7 and 8 are a side view and an end view, respectively, of an exemplary engine nacelle and thrust reverser of the present invention.
Figure 8:
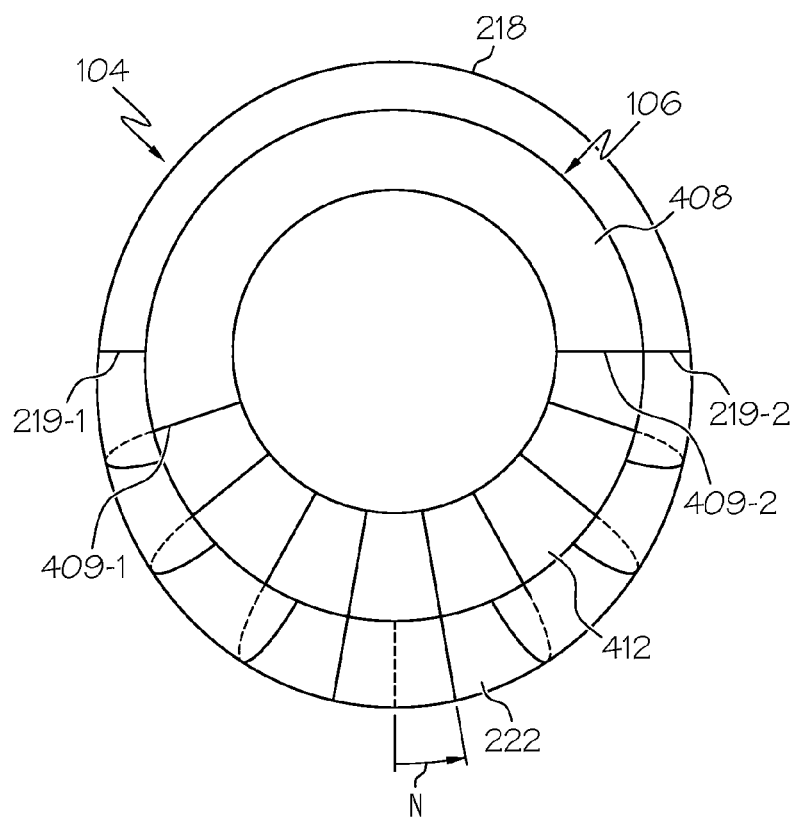

As the skilled artisan may appreciate, when the thrust reversers 106 are rotated the predetermined number of degrees (N), this rotation would, unless otherwise compensated for, create a discontinuity at the interface between the engine nacelle noncircular section 222 and the thrust reverser noncircular section 412. However, as will now be explained, compensation is provided to account for the thrust reverser rotation. In particular, at least a portion of the engine nacelle noncircular section 222 is appropriately contoured. That is, at least a portion of the engine nacelle noncircular section 222 has a contour that is rotated about the rotational axis of symmetry 224. This is depicted more clearly in FIGS. 7 and 8, where a plurality of contour lines are shown on an engine nacelle outer surface noncircular section 222 and on a thrust reverser outer surface noncircular section 412. In both FIGS. 7 and 8, the dotted lines illustrate the contour of the engine nacelle outer surface noncircular section 222 without the rotational compensation, whereas the solid lines on the engine nacelle outer surface noncircular section 222 depict the rotational compensation. It may be readily apparent that the amount that the contour of the engine nacelle outer surface non-circular section 222 is rotated about the rotational axis of symmetry 224 is equal to (or at least substantially equal to) the predetermined number of degrees (N) that the arc section 408 is extended below the horizontal plane 217.

The thrust reversers described herein are non-handed, and can thus be installed on handed aircraft propulsion engines having a noncircular nacelle-to-thrust reverser interface. A portion of the engine nacelles are appropriately contoured to facilitate the non-handed aspect of the thrust reversers. As a result, the additional costs associated with handed thrust reversers is eliminated or at least significantly reduced.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An assembly, comprising:
an engine nacelle configured to have at least a portion of an aircraft gas turbine propulsion engine mounted therein, the engine nacelle comprising an intake end, an exhaust end, and an outer surface that extends between the intake end and the exhaust end, at least the engine nacelle outer surface proximate the exhaust end having a semicircular section and a noncircular section; and
a thrust reverser comprising a forward end, an aft end, and an outer surface that extends between the forward and aft ends, the thrust reverser forward end coupled to the engine nacelle exhaust end, at least the thrust reverser outer surface proximate the forward end having an arc section and a noncircular section, the arc section subtends an angle greater than $\pi$ radians.

2. The assembly of claim 1, wherein the angle that the arc section subtends is a predetermined number of radians greater than $\pi$ radians.

3. The assembly of claim 1, wherein:
the engine nacelle and thrust reverser circumscribe an axis of symmetry that extends between the engine nacelle intake end and the thrust reverser aft end;
the semicircular section extends from the engine nacelle exhaust end a predetermined distance toward the engine nacelle intake end at an upper loft angle relative to the axis of symmetry; and
the engine nacelle outer surface noncircular section extends from the exhaust end a predetermined distance toward the intake end at a lower loft angle relative to the axis of symmetry, the lower loft angle unequal to the upper loft angle.

4. The assembly of claim 3, wherein the lower loft angle is greater than the upper loft angle.

5. The assembly of claim 3, wherein:
the arc section extends between the forward end and the aft end at the upper loft angle; and
the thrust reverser noncircular section extends between the forward end and the aft end at the lower loft angle.

6. The assembly of claim 5, wherein the upper loft angle is less than the lower loft angle.

7. The assembly of claim 3, wherein:
at least a portion of the engine nacelle outer surface noncircular section has a contour that is rotated about the axis of symmetry.

8. The assembly of claim 7, wherein:
the contour of the engine nacelle outer surface noncircular section is rotated in a first rotational direction if the engine nacelle is configured for mounting on a first side of an aircraft; and
the contour of the engine nacelle outer surface noncircular section is rotated in a second rotational direction if the engine nacelle is configured for mounting on a second side of an aircraft.

9. The assembly of claim 7, wherein the angle that the arc section subtends is N-number of radians greater than π radians.

10. The assembly of claim 9, wherein:
the semicircular section includes two ends;
the arc section includes two ends; and
one of the ends of the arc section is coplanar with one of the ends of the semicircular section.

11. An assembly, comprising:
an engine nacelle configured to have at least a portion of an aircraft gas turbine propulsion engine mounted therein, the engine nacelle comprising an intake end, an exhaust end, and an outer surface that extends between the intake end and the exhaust end, at least the engine nacelle outer surface proximate the exhaust end having a semicircular section and a noncircular section; and
a thrust reverser comprising a forward end, an aft end, and an outer surface that extends between the forward and aft ends, the thrust reverser forward end coupled to the engine nacelle exhaust end, at least the thrust reverser outer surface proximate the forward end having an arc section and a noncircular section, the arc section subtends an angle that is a predetermined number of radians greater than π radians,
wherein:
the engine nacelle and thrust reverser circumscribe an axis of symmetry that extends between the engine nacelle intake end and the thrust reverser aft end,
at least a portion of the engine nacelle outer surface noncircular section has a contour that is rotated about the axis of symmetry (i) in a first rotational direction if the engine nacelle is configured for mounting on a first side of an aircraft and (ii) in a second rotational direction if the engine nacelle is configured for mounting on a second side of an aircraft.

12. The assembly of claim 11, wherein:
the semicircular section extends from the engine nacelle exhaust end a predetermined distance toward the engine nacelle intake end at an upper loft angle relative to the axis of symmetry; and
the engine nacelle outer surface noncircular section extends from the exhaust end a predetermined distance toward the intake end at a lower loft angle relative to the axis of symmetry, the lower loft angle unequal to the upper loft angle.

13. The assembly of claim 12, wherein the lower loft angle is greater than the upper loft angle.

14. The assembly of claim 12, wherein:
the arc section extends between the forward end and the aft end at the upper loft angle; and
the thrust reverser noncircular section extends between the forward end and the aft end at the lower loft angle.

15. The assembly of claim 14, wherein the upper loft angle is less than the lower loft angle.

16. The assembly of claim 11, wherein:
the angle that the arc section subtends is N-number of radians greater than π radians.

17. The assembly of claim 11, wherein:
the semicircular section includes two ends;
the arc section includes two ends; and
one of the ends of the arc section is coplanar with one of the ends of the semicircular section.

\* \* \* \* \*